United States Patent Office 3,294,873
Patented Dec. 27, 1966

3,294,873
PHOSPHORYLATED POLYETHER POLYOLS
Martin R. Lutz, Gene Nowlin, and Hugo Stange, Princeton, N.J., assignors to FMC Corporation, New York, N.Y., a corporation of Delaware
No Drawing. Filed Sept. 12, 1961, Ser. No. 137,521
3 Claims. (Cl. 260—929)

This invention relates to phosphorylated polyols, and more particularly it relates to diorgano phosphorylated polyols and the flame-retardant polyurethane compositions derived therefrom.

There has been much investigation in recent years of flame-retardant polyurethane compositions which can be used as foams, coatings and castings for applications in which heat or fire is a hazard. It has been suggested, for example, that some degree of flame-resistance can be achieved by incorporating a flame-retarding additive into the formulation. However, liquid flame-retardants are either incompatible or have a plasticizing action which degrades the properties of the composition. Moreover, liquid additives tend to be lost over a period of time through bleeding and volatilization, thus resulting in a decreasing degree of flame-retardance as the composition ages. On the other hand, solid retardants tend to embrittle the polyurethane composition. Moreover, none of these additives has been completely successful in imparting a high degree of flame-retardance to polyurethane compositions.

It is an object of this invention to provide flame-retardant polyurethane compositions containing no flame-retarding additive.

Another object is to provide high molecular weight polyols containing phosphorus which can be used as intermediates in the preparation of flame-retardant polyurethane compositions.

Still another object is to provide polyether polyols containing phosphorus and halogen.

A further object is to provide polyester polyols containing phosphorus and halogen.

Another object is to provide flame-retardant polyurethane compositions containing phosphorus and halogen in which the phosphorus and halogen contents can be controlled independently.

These and other objects will become apparent from the following description of this invention.

The novel intermediates of this invention which may be used in the preparation of flame-retardant polyurethane compositions are the diorgano phosphorylated high molecular weight polyols comprising the condensation product of (1) a liquid polyol having an average molecular weight of about 200–5,000 and containing an average of at least three hydroxyl groups per molecule, and (2) a diorgano phosphorochloridate having the formula $$(X_nRO)_2P(O)Cl$$

in which X is selected from the group consisting of chlorine and bromine, $n$ is 0–4 and R is an organic radical selected from the group consisting of alkyl radicals containing 1–5 carbon atoms, phenyl, and tolyl, said condensation product containing at least about 2% by weight phosphorus and an average of at least two hydroxyl groups per molecule and having a viscosity of less than about 4,000 poises at 25° C.

The phosphorylated polyols of this invention are reactive with aromatic polyisocyanates to form polyurethane compositions having flame-retardance ranging from self-extinguishing to non-burning. In addition to phosphorus, the polyurethane composition should also contain halogen, either by the use of a di(halo-organo) phosphorylated polyol, or a chlorinated aromatic diisocyanate, or both. The flame-retardance of the compositions will vary depending upon the amount of phosphorus and halogen present.

The high molecular weight polyols which may be used in the preparation of the novel phosphorylated intermediates disclosed herein are the commercially available liquid products containing at least three hydroxyl groups per molecule and known to be useful in the preparation of polyurethane compositions. These polyols have average molecular weights of 200–5,000.

A preferred class of high molecular weight polyols includes the liquid polyether polyols derived from the reaction of a polyol selected from the group consisting of polyhydroxyalkanes containing 3–6 hydroxyl groups and carbohydrates containing 5–8 hydroxyl groups with an alkylene oxide containing 2–4 carbon atoms. Illustrative examples of suitable polyols include polyhydroxyalkanes such as glycerol, trimethylolethane, trimethylolpropane, 1,2,6-hexanetriol, pentaerythritol and sorbitol, and carbohydrates such as sucrose and dextrose, as well as other polyhydroxyalkanes and carbohydrates containing 3–8 hydroxyl groups. Examples of suitable alkylene oxides include ethylene oxide, propylene oxide, epichlorohydrin and butene oxide. Based upon cost, availability and hydrolytic stability of the final product, propylene oxide is preferred.

The polyether polyol is formed by the reaction of at least one equivalent weight of alkylene oxide with each hydroxyl equivalent weight of polyol; one epoxy oxygen group being equivalent to one hydroxyl group. Thus, the condensation product contains one ether linkage and one hydroxyl group for each hydroxyl group originally present in the polyol. If more than one equivalent of alkylene oxide is reacted with each equivalent of polyol, then the polyether polyol will contain more than one ether linkage for each hydroxyl group. The condensation of a hydroxyl group with an epoxy oxygen is illustrated by the following equation:

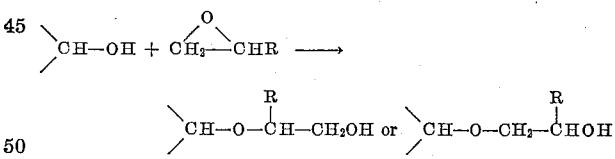

in which either of the indicated products may be formed. Thus, within a single polyol molecule some hydroxyl groups may condense to give one product, while one or more may condense to give the other. When more than one equivalent of alkylene oxide is present for each equivalent of polyol, the excess alkylene oxide condenses with the generated hydroxyl group, thereby increasing the molecular weight of the polyether polyol and the number of possible isomers. The molecular weight of the polyether polyol should be in the range of about 200–5,000, and preferably about 400–2,000.

Additional high molecular weight polyols which may be used in the preparation of the novel phosphorylated polyols disclosed herein include liquid polyester polyols which are hydroxyl-terminated polyesters derived from the reaction of dicarboxylic acids with polyols containing 2–4 hydroxyl groups. Illustrative examples of suitable dicarboxylic acids include succinic, adipic, phthalic, isophthalic, sebacic and chlorendic acids, as well as many other dicarboxylic acids. Examples of suitable polyols include ethylene glycol, diethylene glycol, polyethylene glycol, propylene glycol, dipropylene glycol, polypropylene glycol, glycerol, trimethylolethane, trimethylolpropane, 1,2,6-hexanetriol and pentaerythritol, as well as other polyols containing 2–4 hydroxyl groups. The polyol component may be a single polyol or it may be a mixture of two or more polyols containing 2–4 hydroxyl groups. Since the polyester polyol must contain an average of at least three hydroxyl groups per molecule, the polyol component must contain at least some polyol containing 3–4 hydroxyl groups.

The polyester polyol is formed by the reaction of more than one, but not more than two, hydroxyl equivalent weights of polyol with each carboxyl equivalent weight of dicarboxylic acid; one hydroxyl group being equivalent to one carboxyl group. The acid number of the polyester polyol should not be in excess of about 20, and preferably it is not in excess of about 10. The hydroxyl number should be in the range of about 100–700, and preferably about 300–650. The polyester polyol should have an average of at least three hydroxyl groups per molecule, and preferably at least four. The number of hydroxyl groups per molecule is readily calculated from the hydroxyl number and the molecular weight. The molecular weight should be in the range of about 200–5,000, and preferably about 500–2,000.

The polyester polyols are prepared by conventional techniques such as by reacting the polyol and the diacid at elevated temperatures in the presence, or absence, of an acid catalyst. The general procedure is to start the reaction at a relatively low temperature, such as 80° C., and then raise the temperature to about 160° C. over the first two or three hours of heating. The temperature is then raised more slowly to about 200° C. or more, while removing water as formed. The heating is continued until the desired acid number is reached.

The diorgano phosphorochloridates which are suitable for phosphorylating high molecular weight polyols to the novel intermediates disclosed herein are those having the formula $(X_nRO)_2P(O)Cl$ in which X is selected from the group consisting of chlorine and bromine, $n$ is 0–4 and R is an organic radical selected from the group consisting of alkyls containing 1–5 carbon atoms, phenyl, and tolyl. Illustrative examples of these radicals include alkyls such as methyl, ethyl, β-chloroethyl, β-bromoethyl, β,β-dichloroethyl, β,β,β-trichloroethyl, propyl, isopropyl, β-chloropropyl, β-bromopropyl β,γ-dichloropropyl, β,γ-dibromopropyl, β-bromo-γ-chloropropyl, β,β,γ,γ-tetrachloropropyl, butyl isobutyl, sec.-butyl, β-chlorobutyl, β-bromobutyl and amyl and aromatics such as phenyl chlorophenyl, bromophenyl, dichlorophenyl, trichlorophenyl, o-tolyl, m-tolyl, p-tolyl, chlorotolyls, bromotolyls, and dichlorotolyls, as well as many others.

A preferred class of phosphorochloridates includes the di(haloalkyl) phosphorochloridates having the formula $(X_nRO)_2P(O)Cl$ in which X is selected from the group consisting of chlorine and bromine $n$ is 1–2 and $X_nR$ is a haloalkyl radical containing 2–4 carbon atoms. These di(haloalkyl) phosphorochloridates provide halogen as well as phosphorus and contain fewer carbon atoms than the diaryl phosphorochloridates.

The diorgano phosphorochloridates may be prepared by various methods known to the art. They may be prepared from aliphatic alcohols by reacting with phosphorus trichloride in accordance with the following equation:

$$3ROH + PCl_3 \rightarrow (RO)_2POH + RCl + 2HCl$$

followed by chlorination of the product in accordance with the equation:

$$(RO)_2POH + Cl_2 \rightarrow (RO)_2POCl + HCl$$

The phosphorochloridates may also be prepared from aliphatic or aromatic alcohols by reacting the alcohol with phosphorus oxychloride. This reaction is illustrated by the following equation:

$$2ROH + POCl_3 \rightarrow (RO)_2P(O)Cl + 2HCl$$

Starting with an organic epoxide, the phosphorochloridate may be prepared using a phosphorus trihalide in accordance with the equation:

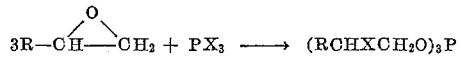

and this product is chlorinated in accordance with the following equation:

$$(RCHXCH_2O)_3P + Cl_2 \rightarrow$$
$$(RCHXCH_2O)_2POCl + RCHXCH_2Cl$$

It has also been found that bis(dichloroalkyl) phosphorochloridates can be prepared from unsaturated alcohols, phosphorus trichloride, and chlorine in accordance with the following equations:

$$3CH_2=CHCH_2OH + PCl_3 \rightarrow (CH_2=CHCH_2O)_2POH$$
$$+ CH_2=CHCH_2Cl + 2HCl (CH_2=CHCH_2O)_2POH$$
$$+ Cl_2 \rightarrow (CH_2ClCHClCH_2O)_2POCl + HCl$$

Both of these reactions are carried out at temperatures ranging from $-10°$ C. to $60°$ C., and preferably from $0$–$20°$ C. Although the reactions may be carried out without a solvent, it is preferable to use a solvent for the dialkenyl hydrogen phosphite intermediate and the phosphorochloridate. Methylene chloride has been found to be a particularly suitable solvent.

The phosphorylation of the high molecular weight polyol is carried out by reacting the phosphorochloridate with the polyol in the presence of an acid acceptor. The reaction of a hydroxyl group with the phosphorochloridate is illustrated by the following equation:

$$>CHOH + (RO)_2P(O)Cl + A \rightarrow$$
$$>CHOP(O)(OR)_2 + A \cdot HCl$$

in which A stands for an acid acceptor. Tertiary amines may be used as the hydrogen chloride acceptor. Triethylamine has been found to be especially effective.

Since the reaction goes to completion, the degree of phosphorylation is readily controlled by the amount of phosphorochloridate present. The phosphorochloridate should be present in an amount sufficient to provide at least about 2% phosphorus in the phosphorylated polyol. In most cases, an equimolar amount of phosphorochloridate and high molecular weight polyol will provide more than this minimum phosphorus requirement. When the high molecular weight polyol contains an average of more than three hydroxyl groups per molecule, more than one mole of phosphorochloridate may be employed per mole of high molecular weight polyol, if desired. The upper limit on the amount of phosphorochloridate which can be employed is determined by the requirement that the phosphorylated product must contain an average of at least two unreacted hydroxyl groups per molecule. In other words, the reaction product should contain at least about 2% phosphorus and an average of at least two hydroxyl groups per molecule.

The high molecular weight polyol which is to be phosphorylated should be free of water since the phosphorochloride reacts with moisture to form undesirable dialkyl hydrogen phosphates. The polyol may be dried by any convenient means, such as by azeotropic distillation with a solvent.

The phosphorylation reaction is suitably conducted by dissolving the high molecular weight polyol in a solvent which does not react with the phosphorochloridate, and preferably in which the trialkylamine hydrochloride formed during the reaction is insoluble. In most cases, benzene has been found to be a suitable solvent. The polyols which are not soluble in benzene are soluble in other solvents, such as chloroform, which also dissolve the trialkylamine hydrochloride y-product. Wheu chloroform is used as the solvent, the trialkylamine hydrochloride can be separated from the product by removing the chloroform and re-dissolving the product mixture in a solvent, such as benzene or acetone, in which the amine hydrochloride is substantially insoluble.

The phosphorylation reaction may be carried out at temperatures of about 30–80° C. At temperatures below about 30° C., the reaction is quite slow, while temperatures above about 80° C. should be avoided to prevent decomposition of the phosphorochloridate. Preferably, the reaction is conducted at about 40–50° C. The reaction should be allowed to proceed for at least one hour, and preferably for 2–5 hours.

In general, the viscosities of the high molecular weight polyols are reduced by phosphorylation. The most pronounced reduction in viscosity is provided by a low degree of phosphorylation. As the degree of phosphorylation is increased, the product becomes increasingly more viscous.

The viscosity of the phosphorylated high molecular weight polyol should be less than about 4,000 poises to be suitable for preparing polyurethane compositions. When the viscosity is less than about 1,000 poises, the phosphorylated polyol is sufficiently fluid that it can be blended with liquid polyisocyanates at room temperature. With viscosities in excess of about 1,000 poises, the phosphorylated polyol must be heated slightly to provide the desired degree of fluidity for blending. If the viscosity exceeds about 4,000 poises, the heat requirement for blending the phosphorylated polyol with the polyisocyanate will be such that they may react before they can be thoroughly blended.

The novel flame-retardant polyurethane compositions derived from the novel phosphorylated polyols disclosed herein are prepared by condensing about one hydroxyl equivalent weight of phosphorylated polyol with at least about one isocyanate equivalent weight of an aromatic polyisocyanate; one hydroxyl group being equivalent to one isocyanate group. In practice, a slight excess of polyisocyanate, for example about 10%, is generally added to insure complete reaction.

The aromatic polyisocyanate may be any of those conventionally used in the preparation of polyurethanes. Examples of these polyisocyanates include aromatic diisocyanates such as 2,4-tolylene diisocyanate, 2,6-tolylene diisocyanate, o-phenylene diisocyanate, m-phenylene diisocyanate, p-phenylene diisocyanate, 3,3'-bitolylene-4,4'-diisocyanate, methylene-p-diphenyl diisocyanate, methylene-4,4'-bis(2-methylphenyl) diisocyanate, 1,5-naphthalene diisocyanate, 3,3'-dimethyl-4,4'-biphenylene diisocyanate, 3,3'-dimethoxy-4,4'-biphenylene diisocyanate, and 2,2',5,5'-tetramethyl-4,4'-biphenylene diisocyanate and higher aromatic polyisocyanates such as methylidynetriphenyl triisocyanate and tolylene-2,4,6-triisocyanate.

A further and preferred class of polyisocyanates for the preparation of flame-retardant polyurethane compositions includes chlorinated aromatic diisocyanates which contain at least about 10% by weight chlorine. These diisocyanates may be used with both halogenated and non-halogenated phosphorylated polyols. Suitable aromatic diisocyanates which are readily chlorinated include m-phenylene diisocyanate, p-phenylene diisocyanate, 2,4-tolyene diisocyanate, 2,6-tolylene diisocyanate, 3,3'-dimethyl-4,4'-biphenylene diisocyanate and methylene-p-diphenyl diisocyanate. These aromatic diisocyanates may be chlorinated by conventional means known in the art. For example, the chlorination of aromatic diisocyanates is fully disclosed by J. J. Tazuma in Patent Nos. 2,915,545 and 2,945,875.

When employing chlorinated aromatic diisocyanates, the phosphorus and halogen contents of the polyurethane compositions may be independently controlled by varying the degree of phosphorylation of the high molecular weight polyol and the chlorine content of the chlorinated aromatic diisocyanate. Moreover, the rigidity of foams and the hardness of coatings prepared from chlorinated diisocyanates are improved over compositions prepared from non-chlorinated polyisocyanates having the same degree of flame-retardance, since the use of a chlorinated aromatic diisocyanate allows a lower degree of phosphorylation and a higher hydroxyl functionality in the high molecular weight polyol. Furthermore, chlorinated aromatic diisocyanates are more reactive than the corresponding non-chlorinated diisocyanates.

Chlorinated diisocyanates are generally solids and must be warmed slightly to form liquids which are easily blended with the phosphorylated polyol. Although the blending can be carried out with solid polyisocyanates in this manner, it is much simpler to use a liquid. Chlorinated aromatic polyisocyanates which are liquid at about room temperature can be prepared by blending chlorinated diisocyanate fractions which are chlorinated to different degrees. For example, liquid mixtures containing 35–45% chlorine are prepared by blending various amounts of dichloro-m-phenylene diisocyanate, trichloro-m-phenylene diisocyanate and tetrachloro-m-phenylene diisocyanate fractions. The blend containing equal amounts of these three fractions has a chlorine content of about 39%.

High exothermic heats of reaction may be avoided in the preparation of polyurethane compositions by forming a phosphorylated polyol-polyisocyanate prepolymer containing residual isocyanate groups. This prepolymer is formed by reacting one equivalent weight of polyisocyanate with less than one, for example 0.25, equivalent weight of phosphorylated polyol. The polyurethane composition is then prepared by reacting the prepolymer with sufficient additional phosphorylated polyol to provide the desired ratio of about one hydroxyl equivalent weight for each isocyanate equivalent weight.

Polyurethane compositions may be prepared using one or more phosphorylated polyols and one or more aromatic polyisocyanates. For example, the high molecular weight polyol component may be a blend of two or more different phosphorylated polyols, or one or more conventional high molecular weight polyols may be blended with one or more phosphorylated polyols. Similarly, two or more aromatic diisocyanates may be blended together.

Although the degree of flame-retardance of a polyurethane composition cannot always be accurately predicted from a knowledge of the phosphorus and halogen content, in most cases the flame-retardance will vary in proportion to the phosphorus and halogen content. It has been found that changes in phosphorus content have a greater effect upon flame-retardance than do changes in halogen content. As a general rule, a polyurethane composition containing 1.75% phosphorus will be nonburning at a halogen content of about 22%. As the phosphorus content rises to 2.25% the halogen content requirement drops to about 17%, while at 3% phosphorus only 9% halogen is required for nonburning polyurethane compositions. In general, it has been found that the polyurethane compositions described herein should contain at least about 5% halogen to possess satisfactory flame-retardance. There are, however, exceptions to these general observations.

Although the burning characteristics of polyurethanes depend primarily on their composition, these characteristics are also affected by the physical form of the polyurethane composition, such as foam, coating, casting, etc. In the case of foams, the burning characteristics are modified by such parameters as density, cell structure, and the composition of the gas within the cells.

The polyurethane compositions taught herein have useful applications as flame-retardant foams, surface coatings, castings and moldings. They are especially useful as rigid foams which can be used as flame-proof insulation materials for the building industry.

Foams are readily prepared by mixing together a phosphorylated polyol, an aromatic polyisocyanate and a blowing agent, such as a fluoroinated hydrocarbon or water. As the reaction between the phosphorylated polyol and the polyisocyanate begins, the exothermic heat of reaction vaporizes the fluorinated hydrocarbon with a resulting expansion of the reaction medium into a foam. When water is used as the blowing agent, it reacts with the polyisocyanate liberating carbon dioxide which expands the reaction medium. Small amounts of additional components such as catalysts and emulsifiers may be added, if desired, to alter the handling characteristics of the reaction mixture or the properties of the foam.

In the illustrative examples which follow, the flame-retardance of the polyurethane foams was measured in accordance with ASTM test method D1692–59T. Samples of the foam measuring 2 x 6 x ½ inch were marked with two lines by drawing lines one inch and five inches from one end of each sample. Thus, each sample was divided into three sections measuring one inch, four inches and one inch. A wing-tipped Bunsen burner flame was applied to one end of the sample until the burning reached the one inch line, or for a period of one minute, whichever was shorter. If the one-inch line was not reached by the burning, the sample was considered to be nonburning. If the sample burned beyond the one-inch line and then went out before reaching the five-inch line, it was rated as self-extinguishing and the amount of burning beyond the one inch line was noted.

The following examples, illustrating the novel phosphorylated polyols disclosed herein and the novel flame-retardant polyurethane compositions derived therefrom, are presented without any intention that the invention be limited thereto. All percentages are by weight.

Example 1

Bis($\beta$-chloroethyl) phosphorochloridate was prepared as follows: A reaction flask was charged with 1490 grams of $PCl_3$ and 1.5 grams of $TiCl_4$. Ethylene oxide was bubbled through the greenish solution and reaction started immediately with the evolution of heat. The temperature was maintained at 30–40° C. by external cooling for about 3 hours, at which point the product turned colorless and the reaction was stopped. The excess ethylene oxide was stripped off at 50° C. and 20 mm. Hg. The product was cooled to 5° C., and chlorine was bubbled into the flask, while maintaining the temperature at 0–20° C. by cooling. After about 3 hours, a color change from colorless to bright yellow was observed and the reaction was stopped. The ethylene chloride and excess chlorine were removed using temperatures up to 60° C. and pressures as low as 0.5 mm. Hg. As product, 2601 grams of bis($\beta$-chloroethyl) phosphorochloridate were recovered.

A phosphorylated polyether polyol was prepared as follows: Four kilograms of a commercially available polyether polyol, derived from the condensation of 1 mole of sorbitol with 6 moles of propylene oxide, was dissolved in 5 kilograms of benzene. The solution was placed in a flask and distilled at atmospheric pressure, removing 3 kilograms of benzene and all water azeotropically. The solution was then cooled to 25° C. and 7 kilograms of benzene and 650 grams of triethylamine were added. One and four-tenths kilograms of bis($\beta$-chloroethyl) phosphorochloridate, dissolved in 1 kilogram of benzene was then added, and after a few minutes, the precipitation of triethylamine hydrochloride started. The mixture was stirred and heated overnight at 40° C., and then cooled to room temperature and filtered. The benzene was stripped off at 40° C., starting at a pressure of 200 mm. Hg, and then at 1 mm. Hg using a kettle temperature not in excess of 70° C. The product contained 5.05 kilograms of bis($\beta$-chloroethyl) phosphorylated polyether polyol having a phosphorus content of 3.4%, a chlorine content of 7.9% and a hydroxyl number of 373. This corresponds to an average of 0.8 phosphorus atom and 5.2 hydroxyl groups per molecule.

A polyurethane foam was prepared as follows: Fifteen grams of the phosphorylated polyol diluted with 5 grams of trichlorofluoromethane to reduce its viscosity was reacted with 103 grams of chlorinated m-phenylene diisocyanate containing 39% chlorine while stirring at 60° C. for 30 minutes under nitrogen. The trichlorofluoromethane diluent was lost through vaporization during this reaction. The resulting prepolymer was blended with 40 grams of trichlorofluoromethane, 0.5 gram of dibutyltin di-2-ethylhexoate, 0.25 gram of N-methylmorpholine and 1.0 gram of a commercially available silicone emulsifier L–520. The mixture was stirred at a high rate until creaming took place, after which the foam was allowed to rise. The foamed product had a density of 1.9 pounds per cubic foot and was found to be nonburning.

Another polyurethane foam was prepared as follows: One hundred grams of the phosphorylated polyether polyol, 40 grams of trichlorofluoromethane, 1.5 grams of stannous octoate and 1.0 gram of silicone emulsifier were blended together by stirring. To the blend was added 131 grams of chlorinated 3,3'-dimethyl-4,4'-biphenylene diisocyanate containing 29% chlorine. The mixture was stirred at a high rate until creaming took place, after which the foam was allowed to rise. The foamed product had a density of 2.1 pounds per cubic foot and was nonburning.

For comparison, a polyurethane foam containing no phosphorus or halogen was produced as follows: One hundred grams of the commercially available polyether polyol which had not been phosphorylated was blended with 40 grams of trichlorofluoromethane, 0.75 gram of stannous octoate and 1.0 gram of silicone emulsifier. To the blend was added 125 grams of tolylene diisocyanate. The mixture was stirred at a high rate until creaming took place, after which the foam was allowed to rise. The foamed product was tested for flame-retardance and found to burn completely.

A polyurethane coating was prepared as follows: Twenty grams of the phosphorylated polyether polyol dissolved in 20 grams of acetone was blended with a mixture containing 21 grams of chlorinated m-phenylene diisocyanate containing 39% chlorine, 19 grams of benzene and 0.05 gram of stannous octoate. A 5-mil coating of the blend was applied to a tinned steel panel using a doctor blade. The coating was air dried for 15 minutes, and then cured in an oven at 125° C. for 15 minutes. The resulting sample was tested for flame-retardance by holding the panel at an angle 60° from the horizontal with the coating facing downward and applying a Bunsen burner flame to the lower edge of the coating for 5 seconds. The coating was found to be nonburning.

For comparison, a polyurethane coating contaning no phosphorus or halogen was prepared as follows: Twenty grams of the commercailly available polyether polyol which had not been phosphorylated was dissolved in 20 grames of acetone and blended with a mixture containing 25 grams of tolylene diisocyanate, 15 grams of benzene and 0.05 gram of stannous octoate. The blend was applied to a tinned steel panel and cured as before. The coating was tested for flame-retardance as before and found to burn completely.

Example 2

A polyester polyol was prepared as follows: Two hundred grams of succinic acid, 404 grams of sebacic acid and 970 grams of trimethylolpropane were blended in a flask and the temperature was gradually raised over a 3-hour period to 150° C. at which temperature the water formed in the reaction was distilled off. The temperature was maintained at 150–170° C. for an additional 19 hours, after which all remaining water was removed by vacuum. The resulting polyester polyol had an acid number of 0 and a hydroxyl number of 544.

The polyester polyol was bis(β-chloroethyl) phosphorylated as follows: Five hundred fifty grams of the polyester polyol was dissolved in 200 milliliters of benzene and placed in a flask containing 200 milliliters of benzene and 110 grams of triethylamine. To the flask was added 241 grams of bis(β-chloroethyl) phosphorochloridate dissolved in 100 milliliters of benzene, and after a few minutes, the precipitation of triethylamine hydrochloride started. The mixture was stirred and heated overnight at 40° C., and then cooled to room temperature and filtered. The benzene was stripped off at 40° C., starting at a pressure of 200 mm. Hg, and then at 1 mm. Hg using a kettle temperature not in excess of 70° C. The bis(β-chloroethyl) phosphorylated polyester polyol contained 4.1% phosphorus, 9.4% chlorine, and had a hydroxyl number of 351. This corresponds to an average of 1.1 phosphorus atoms and 5.7 hydroxyl groups per molecule.

A polyurethane foam was prepared as follows: One hundred grams of the phosphorylated polyester polyol, 30 grams of trichlorofluoromethane, 0.75 gram of stannous octoate, 0.5 gram of 1,4-bis(2-hydroxypropyl)-2-methylpiperazine and 1.0 gram of silicone emulsifier were blended together by stirring. To the blend was added 98 grams of chlorinated m-phenylene diisocyanate containing 39% chlorine. The mixture was stirred at a high rate until creaming took place, after which the foam was allowed to rise. The foamed product had a density of 2.0 pounds per cubic foot and was found to be nonburning.

Another polyurethane foam was prepared as follows: One hundred grams of the phosphorylated polyester polyol, 30 grams of trichlorofluoromethane, 0.75 gram of stannous octoate, 0.5 gram of 1,4-bis(2-hydroxypropyl)-2-methylpiperazine and 1.0 gram of silicone emulsifier were blended together by stirring. To the blend was added 62.5 grams of tolylene diisocyanate. The mixture was stirred at a high rate until creaming took place, after which the foam was allowed to rise. The foamed product had a density of 2.2 pounds per cubic foot and was self-extinguishing after burning 1/8 inch beyond the 1-inch mark.

Another polyurethane foam was prepared as follows: One hundred grams of the phosphorylated polyester polyol, 30 grams of trichlorofluoromethane, 0.75 gram of stannous octoate, 0.5 gram of 1,4-bis(2-hydroxypropyl)-2-methylpiperazine and 1.0 gram of silicone emulsifier were blended together by stirring. To the blend was added 82 grams of chlorinated tolylene diisocyanate contained 22% chlorine. The mixture was stirred at a high rate until creaming took place, after which the foam was allowed to rise. The foamed product had a density of 2.1 pounds per cubic foot and was nonburning.

*Example 3*

A bis(β-chloroethyl) phosphorylated polyester polyol was prepared as follows: Five hundred grams of a commercially available hydroxyl-terminated polyester derived from adipic acid and trimethylolethane and having a hydroxyl number of 430 was reacted with 170 grams of bis-(β-chloroethyl) phosphorochloridate and 75 grams of triethylamine following the procedure of Example 2. The (β-chloroethyl) phosphorylated polyester polyol contained 3.6% phosphorus, 8.4% chlorine and had a hydroxyl number of 257.

A polyurethane foam was prepared as follows: One hundred grams of the phosphorylated polyester polyol, 40 grams of trichlorofluoromethane, 0.55 gram of dibutyltin di-2-ethylhexoate and 0.7 gram of silicone emulsifier were blended together by stirring. To the blend was added 70 grams of chlorinated m-phenylene diisocyanate containing 40% chloride. The mixture was stirred at a high rate until creaming took place, after which the foam was allowed to rise. The foamed product had a density of 2.2 pounds per cubic foot and was found to be nonburning.

Another polyurethane foam was prepared as follows: One hundred grams of the phosphorylated polyester polyol was blended with 50 grams of trichlorofluoromethane, 0.75 gram of stannous octoate, 0.5 gram of 1,4-bis(2-hydroxypropyl)-2-methylpiperazine, 0.25 gram of triethylamine and 1.0 gram of silicone emulsifier. To the blend was added 69 grams of methylene-p-diphenyl diisocyanate. The mixture was stirred at a high rate until creaming took place, after which the foam was allowed to rise. The foamed product had a density of 2.3 pounds per cubic foot and was nonburning.

*Example 4*

A bis(β-chloroethyl) phosphorylated polyester polyol was prepared as follows: Four hundred grams of a commercially available hydroxyl-terminated polyester derived from chlorendic acid, and known as Hetrofoam 190, was dissolved in 200 milliliters of benzene and placed in a flask containing 200 milliliters of benzene and 90 grams of triethylamine. The contents of the flask were reacted with 200 grams of bis(β-chloroethyl) phosphorochloridate dissolved in 100 milliliters of benzene following the procedures of Example 2. The resulting bis-(β-chloroethyl) phosphorylated polyester polyol contained 4.6% phosphorus, 23.8% chlorine, and had a hydroxyl number of 239.

A polyurethane foam was prepared as follows: One hundred grams of the phosphorylated polyester polyol, 30 grams of trichlorofluoromethane, 0.25 gram of stannous octoate and 1.0 gram of silicone emulsifier were blended together by stirring. To the blend was added 67 grams of chlorinated m-phenylene diisocyanate containing 39% chlorine. The mixture was stirred at a high rate until creaming took place, after which the foam was allowed to rise. The foamed product had a density of 2.1 pounds per cubic feet and was found to be nonburning.

*Example 5*

A bis(β-chloroethyl) phosphorylated polyether polyol was prepared as follows: Three hundred forty grams of a commercially available polyether polyol derived from the condensation of 3 moles of propylene oxide with 1 mole of trimethylolpropane was reacted with 241 grams of bis(β-chloroethyl) phosphorochloridate and 115 grams of triethylamine following the procedure of Example 1. The product contained 539 grams of bis(β-chloroethyl) phosphorylated polyether polyl having a phosphorus content of 6%, a chlorine content of 12.3% and a hydroxyl number of 255. This corresponds to an average of 0.92 phosphorus atom and 2.08 hydroxyl groups per molecule.

A polyurethane casting was prepared as follows: Twenty grams of the phosphorylated polyether polyol and 14 grams of chlorinated m-phenylene diisocyanate containing 39% chlorine were blended together while cooling over Dry Ice. The polyurethane composition was fully cured in about 5 minutes. The casting was tested for flame-retardance and found to be nonburning.

*Example 6*

A bis(β-chloroethyl) phosphorylated polyether polyol was prepared as follows: Four hundred grams of a commercially available polyether polyol derived from the condensation of 4.5 moles of propylene oxide with 1 mole of pentaerythritol was reacted with 241 grams of bis (β-chloroethyl) phosphorochloridate and 115 grams of triethylamine following the procedure of Example 1. The product contained 545 grams of bis(β-chloroethyl) phosphorylated polyether polyol having a phosphorus content of 5.4%, a chlorine content of 11.6% and a hydroxyl number of 240. This corresponds to an average of 1.0 phosphorus atom and 3.0 hydroxyl groups per molecule.

A polyurethane foam was prepared as follows: One hundred grams of the phosphorylated polyether polyol, 30 grams of trichlorofluoromethane, 1.0 gram of triethylenediamine, 1.0 gram of dimethylethanolamine, and 1.0 gram of silicone emulsifier were blended together by stirring. To the blend was added 58 grams of chlorinated m-phenylene diisocyanate containing 39% chlorine. The mixture was stirred at a high rate until creaming took place, after which the foam was allowed to rise. The foam was cured in an oven for 2 hours at 80° C. The foamed product had a density of 2.2 pounds per cubic foot and was found to be self-extinguishing after burning ⅛ inch beyond the 1-inch mark.

*Example 7*

A bis($\beta$-chloroethyl) phosphorylated polyether polyol was prepared as follows: Four hundred fifteen grams of a commercially available polyether polyol derived from the condensation of 8 moles of propylene oxide with 1 mole of sucrose was dissolved in 400 milliliters of chloroform and placed in a reaction flask along with 165 grams of triethylamine. Three hundred sixty grams of bis($\beta$-chloroethyl) phosphorochloridate, dissolved in 100 milliliters of chloroform, were added to the flask and a reaction temperature of 40–50° C. was maintained for 5 hours. The chloroform was then stripped off, and the product mixture was diluted with benzene. The mixture was filtered to remove the insoluble triethylamine hydrochloride, and the benzene was removed by stripping. The bis($\beta$-chloroethyl) phosphorylated polyether polyol had a phosphorus content of 6.3%, a chlorine content of 14% and a hydroxyl number of 225. This corresponds to an average of 3 phosphorus atoms and 5 hydroxyl groups per molecule.

A polyurethane foam was prepared as follows: Eighty grams of the phosphorylated polyether polyol derived from sucrose, 20 grams of the phosphorylated polyol prepared in Example 6, 30 grams of trichlorofluoromethane, 0.25 gram of stannous octoate, 0.25 gram of N-methylmorpholine and 1.0 gram of silicone emulsifier were blended together by stirring. To the blend was added 64 grams of chlorinated m-phenylene diisocyanate containing 39% chlorine. The mixture was stirred at a high rate until creaming took place, after which the foam was allowed to rise. The foamed product had a density of 2.2 pounds per cubic foot and was found to be nonburning.

*Example 8*

A bis($\beta$-chloroethyl) phosphorylated polyether polyol was prepared as follows: Four hundred grams of the commercially available polyether polyol used in Example 1 was reacted with 280 grams of bis($\beta$-chloroethyl) phosphorochloridate and 120 grams of triethylamine following the procedure of Example 1 using 500 milliliters of benzene. The product contained 669 grams of bis($\beta$-chloroethyl)phosphorylated polyether polyol having a phosphorus content of 5.8%, a chlorine content of 12% and a hydroxyl number of 315. This corresponds to an average of 1.6 phosphorus atoms and 4.4 hydroxyl groups per molecule.

A polyurethane foam was prepared as follows: One hundred grams of the phosphorylated polyether polyol, 30 grams of trichlorofluoromethane, 0.25 gram of dibutyltin di-2-ethylhexoate, 0.25 gram of N-methylmorpholine and 1.0 gram of silicone emulsifier were blended together by stirring. To the blend was added 49 grams of chlorinated m-phenylene diisocyanate containing 10% chlorine. The mixture was stirred at a high rate until creaming took place, after which the foam was allowed to rise. The foamed product had a density of 2.0 pounds per cubic foot and was found to be nonburning.

*Example 9*

A dimethyl phosphorylated polyether polyol was prepared as follows: Five hundred grams of the commercially available polyether polyol used in Example 1 was reacted with 144 grams of dimethyl phosphorochloridate (prepared from trimethyl phosphite and $Cl_2$) and 110 grams of triethylamine following the procedure of Example 1. The product contained 540 grams of dimethyl phosphorylated polyether polyol having a phosphorus content of 4.6% and a hydroxyl number of 425. This corresponds to an average of 1.13 phosphorus atoms and 4.87 hydroxyl groups per molecule.

A bis($\beta$-chloroethyl) phosphorylated polyether polyol was prepared as follows: Four hundred grams of the commercially available polyether polyol used in Example 1 was reacted with 400 grams of bis($\beta$-chloroethyl) phosphorochloridate and 175 grams of triethylamine following the procedure of Example 1. The product contained 774 grams of bis($\beta$-chloroethyl) phosphorylated polyether polyol containing 6.7% phosphorus, 14.6% chlorine and having a hydroxyl number of 197.

A polyurethane foam was prepared as follows: Eighty grams of the dimethyl phosphorylated polyether polyol, 20 grams of the bis($\beta$-chloroethyl) phosphorylated polyether polyol, 40 grams of trichlorofluoromethane, and 0.68 gram of silicone emulsifier were blended together by stirring. To the blend was added 101 grams of chlorinated m-phenylene diisocyanate containing 40% chlorine. No catalyst was required. The mixture was stirred at a high rate until creaming took place, after which the foam was allowed to rise. The foamed product had a density of 3 pounds per cubic foot and was found to be self-extinguishing after burning ½ inch beyond the 1-inch mark.

*Example 10*

A bis($\beta$-bromoethyl) phosphorylated polyether polyol was prepared as follows: Two thousand grams of the commercially available polyether polyol used in Example 1 was reacted with 680 grams of bis($\beta$-bromoethyl) phosphorochloridate (prepared from ethylene oxide, $Cl_2$ and $PBr_3$) and 220 grams of triethylamine following the procedure of Example 1. The product contained 2,590 grams of bis($\beta$-bromoethyl) phosphorylated polyether polyol having a phosphorus content of 2.4%, a bromine content of 13.3% and a hydroxyl number of 401. This corresponds to an average of 0.6 phosphorus atom and 5.4 hydroxyl groups per molecule.

A polyurethane foam was prepared as follows: One hundred grams of the phosphorylated polyether polyol, 40 grams of trichlorofluoromethane, 0.5 gram of stannous octoate, 0.25 gram of N-methylmorpholine and 1.0 gram of silicone emulsifier were blended together by stirring. To the blend was added 84 grams of chlorinated m-phenylene diisocyanate containing 29.5% chlorine. The mixture was stirred at a high rate until creaming took place, after which the foam was allowed to rise. The foamed product had a density of 1.9 pounds per cubic foot and was found to be self-extinguishing after burning 1.5 inches beyond the 1-inch mark.

*Example 11*

A diisopropyl phosphorylated polyether polyol was prepared as follows: Four hundred grams of the commercially available polyether polyol used in Example 1 was reacted with 160 grams of diisopropyl phosphorochloridate (prepared from triisopropyl phosphite and $Cl_2$) and 93 grams of triethylamine following the procedure of Example 1. The product contained 509 grams of diisopropyl phosphorylated polyether polyol having a phosphorus content of 4.1% and a hydroxyl number of 364. This corresponds to an average of 1.13 phosphorus atoms and 4.87 hydroxyl groups per molecule.

A polyurethane foam was prepared as follows: One hundred grams of the phosphorylated polyether polyol, 40 grams of trichlorofluoromethane, 0.2 gram of N-methylmorpholine, 1.0 gram of dimethylethanolamine and 1.0 gram of silicone emulsifier were blended together by stirring. To the blend was added 88 grams of chlorinated m-phenylene diisocyanate containing 39% chlorine. The mixture was stirred at a high rate until creaming took place, after which the foam was allowed to rise. The foamed product had a density of 1.8 pounds per cubic foot and was found to be self-extinguishing after burning ¾ inch beyond the 1-inch mark.

*Example 12*

Bis($\beta,\lambda$-dichloropropyl) phosphorochloridate was prepared as follows: A reaction flask was charged with 523 grams of allyl alcohol and 400 milliliters of methylene chloride. Four hundred twelve grams of $PCl_3$ dissolved in 100 milliliters of methylene chloride were added over a period of 45 minutes, while keeping the temperature at 0–10° C. Solvent, HCl and allyl chloride were then stripped off at 20 mm. Hg and temperatures up to 40° C. Three hundred milliliters of fresh methylene chloride were then added, and the solution was chlorinated at 0–5° C. until the color turned yellow. The solvent and dissolved HCl were then stripped off at 20 mm. Hg and 55° C.

A phosphorylated polyether polyol was prepared as follows: Eight hundred ten grams of the commercially available polyether polyol used in Example 1 was reacted with 450 grams of bis($\beta,\lambda$-dichloropropyl) phosphorochloridate and 146 grams of triethylamine following the procedure of Example 1. The product contained 2330 grams of bis($\beta,\lambda$-dichloropropyl) phosphorylated polyether polyol having a phosphorus content of 3.5%, a chlorine content of 14.3% and a hydroxyl number of 375. This corresponds to an average of 0.9 phosphorus atom and 5.1 hydroxyl groups per molecule.

A polyurethane foam was prepared as follows: Ninety grams of the phosphorylated polyether polyol, 10 grams of a commercially available polyether polyol derived from the condensation of 7 moles of propylene oxide with 1 mole of pentaerithritol, 40 grams of trichlorofluoromethane, and 1.0 gram of silicone emulsifier were blended together by stirring. To the blend was added 97 grams of chlorinated m-phenylene diisocyanate containing 27% chlorine. No catalyst was required. The mixture was stirred at a high rate until creaming took place, after which the foam was allowed to rise. The foamed product had a density of 1.9 pounds per cubic foot and was found to be self-extinguishing after burning ⅛ inch beyond the 1-inch mark.

*Example 13*

Diisobutyl phosphorochloridate was prepared as follows: A reaction flask was charged with 220 grams of isobutanol and 136 grams of $PCl_3$ were added over a period of 30 minutes while keeping the temperature at 0–10° C. Butyl chloride and HCl were then stripped off at 20 mm. Hg and temperatures up to 40° C. and the remaining liquid was distilled. The fraction boiling at 84° C. at 0.2 mm. Hg was chlorinated at 0–5° C. until the color turned yellow. The product was stripped at 20 mm. Hg and 55° C. to remove dissolved HCl, and distilled to give 201 grams of diisobutyl phosphorochloridate boiling at 81° C. at 0.8 mm. Hg.

A polyester polyol was phosphorylated as follows: Two hundred sixty grams of the polyester polyol prepared in Example 2 was dissolved in 80 milliliters of benzene and placed in a flask containing 80 milliliters of benzene and 70 grams of triethylamine. To the flask was added 150 grams of diisobutyl phosphorochloridate dissolved in 40 milliliters of benzene and the reaction was carried out following the procedure of Example 2. The resulting diisobutyl phosphorylated polyester polyol contained 5.7% phosphorus and had a hydroxyl number of 294. This corresponds to an average of 1.8 phosphorus atoms and 5 hydroxyl groups per molecule.

A polyurethane foam was prepared as follows: One hundred grams of the phosphorylated polyester polyol, 40 grams of trichlorofluoromethane, 0.75 gram of stannous octoate, 0.25 gram of N-methylmorpholine, 0.5 gram of 1,4-bis(2-hydroxypropyl)-2-methylpiperazine and 1.0 gram of silicone emulsifier were blended together by stirring. To the blend was added 82 grams of chlorinated m-phenylene diisocyanate containing 39% chlorine. The mixture was stirred at a high rate until creaming took place, after which the foam was allowed to rise. The foamed product had a density of 2.0 pounds per cubic foot and was found to be nonburning.

*Example 14*

A bis($\beta$-chlorobutyl) phosphorylated polyester polyol was prepared as follows: Three hundred forty-three grams of the polyester polyol prepared in Example 2 was reacted with 268 grams of bis($\beta$-chlorobutyl) phosphorochloridate (prepared from butene oxide, $PCl_3$ and $Cl_2$) and 100 grams of triethylamine following the procedure of Example 2 using 500 milliliters of benzene. The product contained 550 grams of bis($\beta$-chlorobutyl) phosphorylated polyester polyol having a phosphorus content of 4.8%, a chlorine content of 11% and a hydroxyl number of 240.

A polyurethane foam was prepared as follows: One hundred grams of the phosphorylated polyester polyol, 30 grams of trichlorofluoromethane, 1.0 gram of triethylamine and 1.0 gram of silicone emulsifier were blended together by stirring. To the blend was added 67 grams of chlorinated m-phenylene diisocyanate containing 39% chlorine. The mixture was stirred at a high rate until creaming took place, after which the foam was allowed to rise. The foamed product had a density of 2.0 pounds per cubic foot and was found to be nonburning.

*Example 15*

A di-n-amyl phosphorylated polyester polyol was prepared as follows: Two hundred sixty grams of the polyester polyol prepared in Example 2 was reacted with 172 grams of di-n-amyl phosphorochloridate (prepared from n-amyl alcohol, $PCl_3$ and $Cl_2$) and 70 grams of triethylamine following the procedure of Example 2 using 200 milliliters of benzene. The product contained 590 grams of di-n-amyl phosphorylated polyester polyol having a phosphorus content of 5.1% and a hydroxyl number of 260. This corresponds to an average of 1.8 phosphorus atoms and 5 hydroxyl groups per molecule.

A polyurethane foam was prepared as follows: One hundred grams of the phosphorylated polyester polyol, 30 grams of trichlorofluoromethane, 0.75 gram of stannous octoate, 0.5 gram of 1,4-bis(2-hydroxypropyl)-2-methylpiperazine and 1.0 gram of silicone emulsifier were blended together by stirring. To the blend was added 73 grams of chlorinated m-phenylene diisocyanate containing 39% chlorine. The mixture was stirred at a high rate until creaming took place, after which the foam was allowed to rise. The foamed product had a density of 2.1 pounds per cubic foot and was found to be self-extinguishing after burning ⅛ inch beyond the 1-inch mark.

*Example 16*

Bis(2,4-dichlorophenyl) phosphorochloridate was prepared as follows: A reaction flask was charged with 500 grams of 2,4-dichlorophenol and 275 grams of $POCl_3$. The reaction temperature was maintained at 160° C. for 9 hours, 180° C. for 5 hours, and finally at 200° C. for 4 hours. The HCl evolved was bubbled into a NaOH solution, and the reaction was stopped after 6 moles of NaOH had been neutralized. The crude product was distilled, and 245 grams of bis(2,4-dichlorophenyl) phosphorochloride was recovered as a fraction boiling at 195–210° C. at 0.4–0.2 mm. Hg.

A phosphorylated polyether polyol was prepared by reacting 250 grams of the commercially available polyether polyol used in Example 1 with 153 grams of bis(2,4-dichlorophenyl) phosphorochloridate and 40 grams of triethylamine following the procedure of Example 1. The product contained 390 grams of bis(2,4-dichlorophenyl) phosphorylated polyether polyol having a phosphorus content of 2.9%, a chlorine content of 13.6% and a hydroxyl number of 326. This corresponds to an average of 0.8 phosphorus atom and 5.2 hydroxyl groups per molecule.

A polyurethane foam was prepared as follows: One hundred grams of the phosphorylated polyether polyol, 60 grams of trichlorofluoromethane, 1.0 gram of stannous octoate and 1.0 gram of silicone emulsifier were blended together by stirring. To the blend was added 77 grams of chlorinated m-phenylene diisocyanate containing 39% chlorine. The mixture was stirred at a high rate until creaming took place, after which the foam was allowed to rise. The foamed product had a density of 2.0 pounds per cubic foot and was found to be self-extinguishing after burning ⅛ inch beyond the 1-inch mark.

*Example 17*

A diphenyl phosphorylated polyether polyol was prepared as follows: Two hundred fifty grams of the commercially available polyether polyol used in Example 1 was reacted with 100 grams of diphenyl phosphorochloridate (prepared from phenol and $POCl_3$) and 40 grams of triethylamine following the procedure of Example 1. The product contained 336 grams of diphenyl phosphorylated polyether polyol having a phosphorus content of 3.3% and a hydroxyl number of 383. This corresponds to an average of 0.8 phosphorus atom and 5.2 hydroxyl groups per molecule.

A polyurethane foam was prepared as follows: One hundred grams of the phosphorylated polyether polyol, 40 grams of trichlorofluoromethane, 1.0 gram of dimethylethanolamine, 1.0 gram of triethylamine and 1.0 gram of silicone emulsifier were blended together by stirring. To the blend was added 94 grams of chlorinated m-phenylene diisocyanate containing 39% chlorine. The mixture was stirred at a high rate until creaming took place, after which the foam was allowed to rise. The foamed product had a density of 2.1 pounds per cubic foot and was found to be self-extinguishing after burning ⅜ inch beyond the 1-inch mark.

*Example 18*

A di-p-tolyl phosphorylated polyester polyol was prepared as follows: Three hundred eighty-five grams of the polyester polyol prepared in Example 2 was reacted with 296 grams of di-p-tolyl phosphorochloridate (prepared from p-cresol and $POCl_3$) and 110 grams of triethylamine following the procedure of Example 2 using 300 milliliters of benzene. The product contained 600 grams of di-p-tolyl phosphorylated polyester polyol having a phosphorus content of 4.8% and a hydroxyl number of 245. This corresponds to an average of 1.8 phosphorus atoms and 5 hydroxyl groups per molecule.

A polyurethane foam was prepared as follows: One hundred grams of the phosphorylated polyester polyol, 30 grams of trichlorofluoromethane, 0.75 gram of stannous octoate, 0.5 gram of 1,4-bis(2-hydroxypropyl)-2-methylpiperazine and 1.0 gram of silicone emulsifier were blended together by stirring. To the blend was added 68 grams of chlorinated m-phenylene diisocyanate containing 39% chlorine. The mixture was stirred at a high rate until creaming took place, after which the foam was allowed to rise. The foamed product had a density of 2.2 pounds per cubic foot and was found to be self-extinguishing after burning ½ inch beyond the 1-inch mark.

*Example 19*

A bis(chlorotolyl) phosphorylated polyester polyol was prepared as follows: Three hundred eighty-five grams of the polyester polyol prepared in Example 2 was reacted with 237 grams of bis(chlorotolyl) phosphorochloridate (prepared from monochlorinated p-cresol and $POCl_3$) and 70 grams of triethylamine following the procedure of Example 1 using 300 milliliters of benzene. The product contained 570 grams of bis(chlorotolyl) phosphorylated polyester polyol having a phosphorus content of 3.5%, a chlorine content of 7.7% and a hydroxyl number of 299. This corresponds to an average of 1.1 phosphorus atoms and 5.7 hydroxyl groups per molecule.

A polyurethane foam was prepared as follows: One hundred grams of the phosphorylated polyester polyol, 30 grams of trichlorofluoromethane, 0.5 gram of stannous octoate and 1.0 gram of silicone emulsifier were blended together by stirring. To the blend was added 77 grams of chlorinated m-phenylene diisocyanate containing 34.5% chlorine. The mixture was stirred at a high rate until creaming took place, after which the foam was allowed to rise. The foamed product had a density of 2.2 pounds per cubic foot and was found to be non-burning.

As will be apparent to those skilled in the art, numerous additional variations and combinations of organophosphorochloridates with high molecular weight polyols, and of the phosphorylated polyols derived therefrom with aromatic polyisocyanates may be made without departing from the spirit of the invention or the scope of the following claims.

We claim:
1. A diorgano phosphorylated polyether polyol comprising the condensation product of
   (1) a liquid polyether polyol having an average molecular weight of 200–5,000 derived from the reaction of
      (a) one hydroxyl equivalent of a polyol selected from the group consisting of polyhydroxyalkanes containing 3–6 hydroxyl groups and carbohydrates containing 5–8 hydroxyl groups with
      (b) at least one equivalent weight of an alkylene oxide containing 2–4 carbon atoms, and
   (2) a diorgano phosphorochloridate having the formula $(X_nRO)_2P(O)Cl$ in which X is selected from the group consisting of chlorine and bromine, n is 0–4 and R is an organic radical selected from the group consisting of alkyls containing 1–5 carbon atoms, phenyl and tolyl,
   said condensation product containing at least 2% by weight phosphorus and at least two hydroxyl groups per molecule, and having a viscosity of less than 4,000 poises at 25° C.

2. A di(haloalkyl) phosphorylated polyether polyol comprising the condensation product of
   (1) a liquid polyether polyol having an average molecular weight of 400–2,000 derived from the reaction of
      (a) one hydroxyl equivalent of a polyhydroxyalkane containing 4–6 hydroxyl groups with
      (b) at least one equivalent weight of propylene oxide, and
   (2) a di(haloalkyl) phosphorochloridate having the formula $(X_nRO)_2P(O)Cl$ in which X is selected from the group consisting of chlorine and bromine, n is 1–2 and $X_nR$ is a haloalkyl radical containing 2–4 carbon atoms,
   said condensation product containing at least 4% by weight phosphorus and at least three hydroxyl groups per molecule, and having a viscosity of less than 1,000 poises at 25° C.

3. A bis(β-chloroethyl) phosphorylated polyether polyol comprising the condensation product of
(1) the polyether polyol derived from the reaction of one mole of sorbitol with six moles of propylene oxide and
(2) bis(β-chloroethyl) phosphorochloridate,
said polyether polyol and said phosphorochloridate being in a mole ratio in the range of 1:1 to 1:2.

References Cited by the Examiner
UNITED STATES PATENTS

| | | | |
|---|---|---|---|
| 1,945,183 | 1/1934 | Clemmensen | 260—461 |
| 2,409,039 | 10/1946 | Hardy | 260—461 |
| 2,610,978 | 9/1952 | Lanham | 260—461 |
| 2,866,774 | 12/1958 | Price | 260—77.5 |
| 2,929,800 | 3/1960 | Hill | 260—77.5 |

OTHER REFERENCES

Schrader, Die Entwicklung Neuer Insektizider Phosphorsaure-Ester (1963), page 260.

CHARLES B. PARKER, *Primary Examiner.*

NORMAN G. TORCHIN, *Examiner.*

M. C. JACOBS, D. R. PHILLIPS, R. L. RAYMOND,
*Assistant Examiners.*